United States Patent
Danilov et al.

(10) Patent No.: US 11,209,996 B2
(45) Date of Patent: Dec. 28, 2021

(54) MAPPED CLUSTER STRETCHING FOR INCREASING WORKLOAD IN A DATA STORAGE SYSTEM

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/511,161

(22) Filed: Jul. 15, 2019

(65) Prior Publication Data

US 2021/0019064 A1 Jan. 21, 2021

(51) Int. Cl.
*G06F 3/06* (2006.01)
*G06F 16/22* (2019.01)

(52) U.S. Cl.
CPC .......... *G06F 3/0629* (2013.01); *G06F 3/0604* (2013.01); *G06F 3/067* (2013.01); *G06F 16/22* (2019.01)

(58) Field of Classification Search
CPC ...... G06F 3/0629; G06F 3/0604; G06F 3/067; G06F 16/22
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,502,243 B1 | 12/2002 | Thomas |
| 7,389,393 B1 | 6/2008 | Karr et al. |
| 7,577,091 B2 * | 8/2009 | Antal .................. H04L 41/5054 370/229 |
| 7,631,051 B1 | 12/2009 | Fein et al. |
| 7,664,839 B1 | 2/2010 | Karr et al. |
| 7,680,875 B1 | 3/2010 | Shopiro et al. |
| 7,721,044 B1 * | 5/2010 | Chatterjee ............... G06F 3/067 711/114 |
| 8,125,406 B1 | 2/2012 | Jensen et al. |

(Continued)

OTHER PUBLICATIONS

Non-Final Office Action received for U.S. Appl. No. 16/177,285 dated Jul. 22, 2020, 31 pages.

(Continued)

*Primary Examiner* — Tuan V Thai
(74) *Attorney, Agent, or Firm* — Amin, Turocy & Watson, LLP

(57) ABSTRACT

The described technology is generally directed towards stretching a mapped storage clusters by adding nodes to a mapped cluster of mapped nodes and storage devices mapped to a real cluster of nodes and storage devices. Stretching the mapped cluster can provide additional computing resources to a set of storage devices. In one implementation, one or more newly mapped nodes are added to increase the node count of an existing mapped cluster to form a stretched cluster, with the storage devices distributed among the increased number of nodes; a mapping table is updated to relate the stretched cluster nodes and storage devices to the real cluster nodes and storage devices. Also described is un-stretching a stretched cluster, or further stretching a stretched cluster.

20 Claims, 10 Drawing Sheets

(56) References Cited

U.S. PATENT DOCUMENTS

| | | |
|---|---|---|
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 * | 4/2020 | Naeni ............... G06F 11/1662 |
| 10,644,408 B2 | 5/2020 | Sakai et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,797,863 B2 | 10/2020 | Chen et al. |
| 10,846,003 B2 | 11/2020 | Danilov et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |

(56) References Cited

U.S. PATENT DOCUMENTS

| | | | |
|---|---|---|---|
| 2016/0170668 A1* | 6/2016 | Mehra | G06F 9/5088 711/165 |
| 2016/0217104 A1 | 7/2016 | Kamble et al. | |
| 2016/0232055 A1 | 8/2016 | Vairavanathan et al. | |
| 2016/0253400 A1 | 9/2016 | McAlister et al. | |
| 2016/0277497 A1 | 9/2016 | Bannister et al. | |
| 2016/0292429 A1 | 9/2016 | Bannister et al. | |
| 2016/0294419 A1 | 10/2016 | Sandell et al. | |
| 2016/0328295 A1 | 11/2016 | Baptist et al. | |
| 2016/0357443 A1 | 12/2016 | Li et al. | |
| 2016/0357649 A1 | 12/2016 | Karrotu et al. | |
| 2016/0371145 A1 | 12/2016 | Akutsu et al. | |
| 2016/0378624 A1 | 12/2016 | Jenkins, Jr. et al. | |
| 2016/0380650 A1 | 12/2016 | Calder et al. | |
| 2017/0003880 A1 | 1/2017 | Fisher et al. | |
| 2017/0004044 A1 | 1/2017 | Tormasov et al. | |
| 2017/0017671 A1 | 1/2017 | Baptist et al. | |
| 2017/0031945 A1 | 2/2017 | Sarab et al. | |
| 2017/0097875 A1 | 4/2017 | Jess et al. | |
| 2017/0102993 A1 | 4/2017 | Hu et al. | |
| 2017/0116088 A1 | 4/2017 | Anami et al. | |
| 2017/0187398 A1 | 6/2017 | Trusov | |
| 2017/0187766 A1 | 6/2017 | Zheng et al. | |
| 2017/0206025 A1 | 7/2017 | Viswanathan | |
| 2017/0206135 A1 | 7/2017 | Zeng | |
| 2017/0212680 A1 | 7/2017 | Waghulde | |
| 2017/0212845 A1 | 7/2017 | Conway | |
| 2017/0235507 A1 | 8/2017 | Sinha et al. | |
| 2017/0262187 A1 | 9/2017 | Manzanares et al. | |
| 2017/0268900 A1 | 9/2017 | Nicolaas et al. | |
| 2017/0285952 A1 | 10/2017 | Danilov et al. | |
| 2017/0286009 A1 | 10/2017 | Danilov et al. | |
| 2017/0286436 A1 | 10/2017 | Neporada et al. | |
| 2017/0286516 A1 | 10/2017 | Horowitz et al. | |
| 2017/0288701 A1 | 10/2017 | Slik et al. | |
| 2017/0344285 A1 | 11/2017 | Choi et al. | |
| 2018/0052744 A1 | 2/2018 | Chen et al. | |
| 2018/0063213 A1 | 3/2018 | Bevilacqua-Linn et al. | |
| 2018/0074881 A1 | 3/2018 | Burden | |
| 2018/0121286 A1 | 5/2018 | Sipos | |
| 2018/0129417 A1 | 5/2018 | Sivasubramanian et al. | |
| 2018/0181324 A1 | 6/2018 | Danilov et al. | |
| 2018/0181475 A1 | 6/2018 | Danilov et al. | |
| 2018/0181612 A1 | 6/2018 | Danilov et al. | |
| 2018/0246668 A1 | 8/2018 | Sakashita et al. | |
| 2018/0267856 A1 | 9/2018 | Hayasaka et al. | |
| 2018/0267985 A1 | 9/2018 | Badey et al. | |
| 2018/0306600 A1 | 10/2018 | Nicolaas et al. | |
| 2018/0307560 A1 | 10/2018 | Vishnumolakala et al. | |
| 2018/0341662 A1 | 11/2018 | He | |
| 2018/0375936 A1 | 12/2018 | Chirammal et al. | |
| 2019/0028179 A1 | 1/2019 | Kalhan | |
| 2019/0034084 A1 | 1/2019 | Nagarajan et al. | |
| 2019/0043201 A1 | 2/2019 | Strong et al. | |
| 2019/0043351 A1 | 2/2019 | Yang et al. | |
| 2019/0050301 A1 | 2/2019 | Juniwal et al. | |
| 2019/0065092 A1 | 2/2019 | Shah et al. | |
| 2019/0065310 A1 | 2/2019 | Rozas | |
| 2019/0114223 A1 | 4/2019 | Pydipaty et al. | |
| 2019/0205437 A1 | 7/2019 | Larson et al. | |
| 2019/0215017 A1 | 7/2019 | Danilov et al. | |
| 2019/0220207 A1 | 7/2019 | Lingarajappa | |
| 2019/0356416 A1 | 11/2019 | Yanovsky et al. | |
| 2019/0384500 A1 | 12/2019 | Danilov et al. | |
| 2019/0386683 A1 | 12/2019 | Danilov et al. | |
| 2020/0026810 A1 | 1/2020 | Subramaniam et al. | |
| 2020/0042178 A1 | 2/2020 | Danilov et al. | |
| 2020/0050510 A1 | 2/2020 | Chien et al. | |
| 2020/0104377 A1 | 4/2020 | Eamesty, Jr. et al. | |
| 2020/0117556 A1 | 4/2020 | Zou et al. | |

OTHER PUBLICATIONS

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Office Action received for U.S. Appl. No. 16/254,073, dated Aug. 18, 2020, 62 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer_science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Non-Final Office Action received for U.S. Appl. No. 15/651,504 dated Mar. 21, 2019, 10 pages.

Non-Final Office Action received for U.S. Appl. No. 15/662,273 dated Nov. 16, 2018, 19 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels—RAID 6, URL: https://en.wikipedia.org/wiki/Standard_RAID_levels#RAID_6", Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non-Final Office Action received for U.S. Appl. No. 16/177,278 dated Dec. 2, 2019, 55 pages.

Non-Final Office Action received for U.S. Appl. No. 15/651,504 dated Dec. 31, 2019, 18 pages.

Non-Final Office Action received for U.S. Appl. No. 16/010,246 dated Dec. 5, 2019, 67 pages.

Stonebreaker et al. "Distributed RAID—A New Multiple Copy Algorithm.", IEEE ICDE, 1990, pp. 430-437.

(56) References Cited

OTHER PUBLICATIONS

Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf,Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.

\* cited by examiner

MAPPED CLUSTER STRETCHING FOR INCREASING WORKLOAD IN A DATA STORAGE SYSTEM

TECHNICAL FIELD

The subject application generally relates to data storage, and more particularly to increasing a number of mapped nodes to facilitate improved processing in a data storage system, and related embodiments.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. A mapped Redundant Array of Independent Nodes (RAIN), also referred to a mapped cluster, is a virtualization technology based on a relationship of logically mapped nodes to an underlying real storage device (e.g., disk) pool, comprising a real cluster (RAIN). A mapping table that can be accessed by software/firmware maintains information about the relationship between the mapped nodes and the disks in the disk pool/real cluster.

A real cluster comprises N nodes and each cluster node manages M disks; the N×M disks form the disk pool. A mapped cluster, with fewer nodes (N') than the number of real nodes N, can be built using disks from the disk pool, such that one real cluster may accommodate two or more mapped clusters. A mapped node can manage any number of disks (M') from the disk pool, e.g., each mapped node may manage M' disks allocated from the disk pool, and M' can be the same as or larger or smaller than M. There are generally no limitations on distributing disks among mapped nodes, except that (based on good data storage practices) there can be a constraint that two or more disks managed by one real node cannot go to different mapped nodes of one mapped cluster; (otherwise a failure of a real node would impact two or more mapped nodes).

In certain circumstances, a mapped cluster may be unable to efficiently and properly handle an increase in workload. For example, consider a large amount of archived data that needs to be processed for analytics. One option is to process the data at a moderate speed to run the analytics, however with large amounts of data, the results may not be available for months or years, which is likely not what is desired. Another option is to try to get results sooner by heavily loading the computing resources; however with a very high workload there is a risk of destabilizing the storage system.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
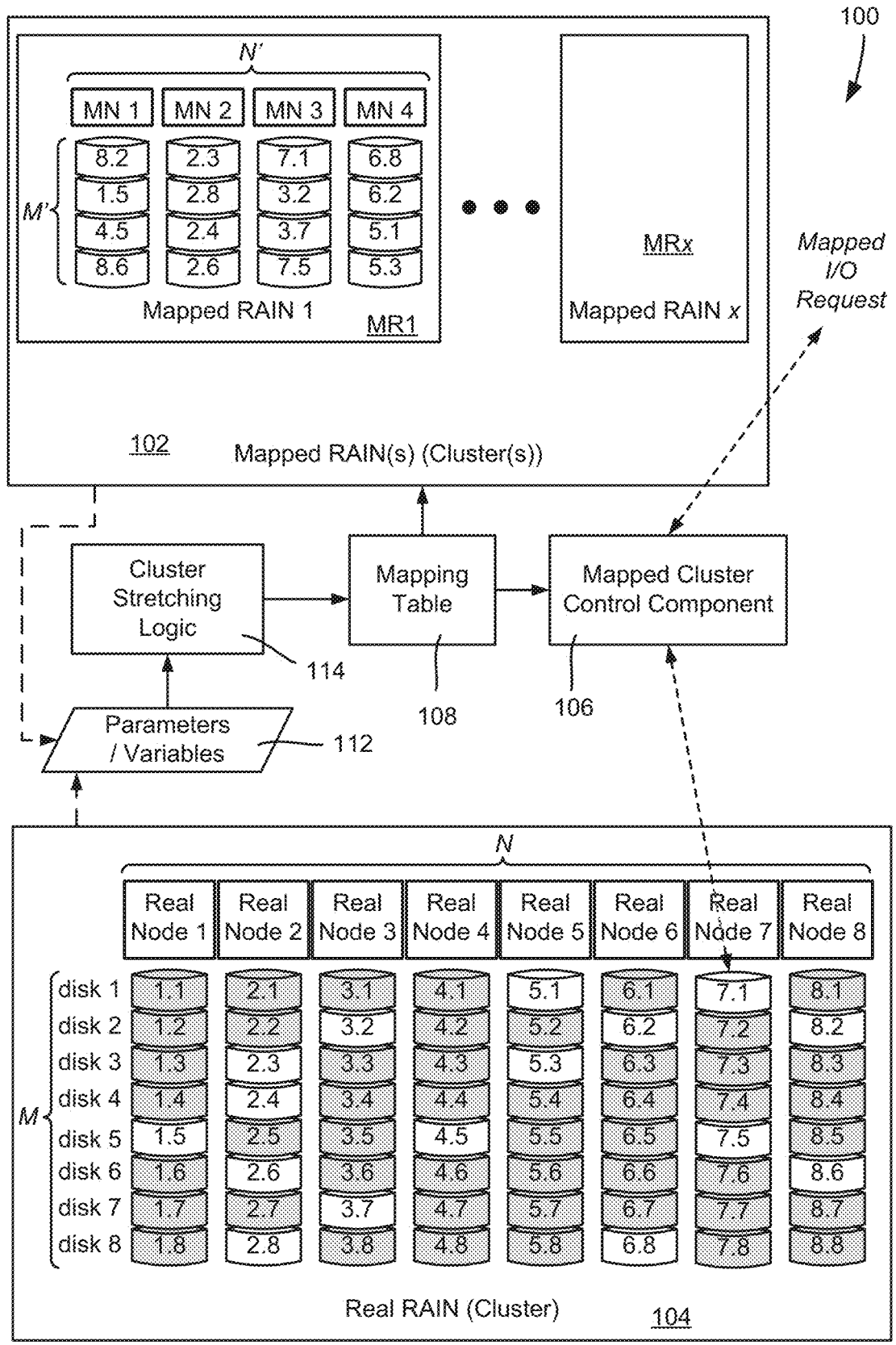
FIG. 1 is an example block diagram representation of a mapped cluster (RAIN) capable of being stretched into a stretched cluster comprising more nodes and the same number of storage devices (e.g., disks), in accordance with various aspects and implementations of the subject disclosure.

The technology described herein is directed towards increasing the node count in a mapped cluster while leaving the number of mapped storage devices (e.g., disks) managed by the nodes of the mapped cluster the same. The technology described herein can be referred to as cluster "stretching" or forming a "stretched" cluster or the like; (note that cluster stretching is in contrast to scaling out, which increases the number of storage devices). Cluster stretching operates to improve computing in the event of an increase in compute workload in a cluster-based storage system, and as described herein, can be performed seamlessly as a result of the system flexibility provided by mapped cluster (mapped Redundant Array of Independent Nodes, or RAIN) technology, and in particular, by modification of a mapping data structure (mapping table).

In addition to stretching a cluster, a stretched cluster can be returned to its previous form, such as when the stretched cluster is no longer needed, e.g., by using the prior mapping data structure. Still further, a stretched cluster can be further stretched, such as if the stretched cluster needs further performance improvement.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/ implementation is included in at least one embodiment/ implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As will be understood, the implementation(s) described herein are non-limiting examples, and variations to the technology can be implemented. For instance, the examples herein are based on cluster stretching by increasing the number of mapped nodes of a mapped RAIN, (used synonymously herein with "mapped cluster" and/or "mapped nodes") without increasing the number of storage devices of the mapped cluster. However, it is feasible to consider that cluster stretching can be used in combination with scaling out; for example, it may be feasible to increase the number of mapped nodes by a significant number (cluster stretching) and also add a single storage device or small number of storage devices (scaling out) for a given application that can benefit from increased storage. Thus, cluster stretching and scaling out are not mutually exclusive. As another example, disks are used as example storage devices, however disks are only examples, and any data storage resource/storage device may be used instead of or in addition to disks such as a combination of volatile storage devices (e.g., fast RAM memory) and/or non-volatile memory including but not limited to solid state storage devices and disk storage devices can be used to implement the technology described herein. As such, any of the embodiments, aspects, concepts, structures, functionalities, implementations and/or examples described herein are non-limiting, and the technology may be used in various ways that provide benefits and advantages in virtualization and data storage technologies in general.

As set forth above, data storage techniques can conventionally store data in one or more arrays of data storage devices. Data can conventionally be stored in a group of nodes formatted for a given cluster, for example, with the disks of nodes being considered part of a group. As a result, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via large real groups, but still providing smaller logical groups that can be used more efficiently for storing smaller amounts of data therein. The concept of a mapped cluster provides such smaller logical groups.

FIG. 1 is an illustration of a system 100 that can facilitate storage of data in one or more mapped RAINs 102, in accordance with aspects of the subject disclosure. The system 100 can comprise a real RAIN/cluster 104 comprising one or more hardware nodes (N) that each comprise one or more (M) storage resources/devices, e.g., hard disks, optical storage, solid state storage, etc. For example, in FIG. 1, the mapped cluster MR1 comprises the unshaded storage devices related to the real cluster 104, with the storage devices labeled (identified by node no.disk no. as) 8.2, 1.5, 4.5, 8.6 (managed by mapped node MN1), 2.3, 2.8, 2.4, 2.6 (managed by mapped node MN2), 7.1, 3.2, 3.7, 7.5 (managed by mapped node MN3) and 6.8, 6.2, 5.1, 5.3 (managed by mapped node MN4).

Once mapped, the real RAIN/cluster 104 can receive data I/O requests (input data writes/output data reads) corresponding to logical storage locations in a mapped RAIN MR1-MRx; e.g., data in real storage is accessed by an I/O request referencing the mapped RAIN cluster storage 102, but served from the real cluster 104. Thus, the data as stored in portions of the one or more storage devices of the real cluster 104 can be accessed by a mapped cluster control component 106 according to a logical mapping of the storage space, e.g., maintained in a mapping table 108, as generally represented in FIG. 1 by the slanted, dashed lines. For example, an I/O request directed to mapped node MN3 of the mapped RAIN MR1, via the mapped cluster control component 106 based on information in the mapping table 108, can be directed to real storage device 7.1.

In an aspect, any of the mapped cluster(s) 102 can be a logical allocation of storage space of a real cluster 104. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc.

Thus, one mapped node can manage a set of one or more disks of one real node, and the storage services of the mapped node need to run on the real node to which the set of disks is connected. Described herein is a technology for stretching a mapped cluster. To this end, one or more new mapped nodes are added to an existing mapped cluster, thus increasing the mapped cluster's node count (e.g., from N' to N") to form the stretched (mapped) cluster, while the count of storage devices of the stretched cluster remain the same. The storage devices are redistributed among the mapped nodes, including the new mapped nodes.

Figure 2:
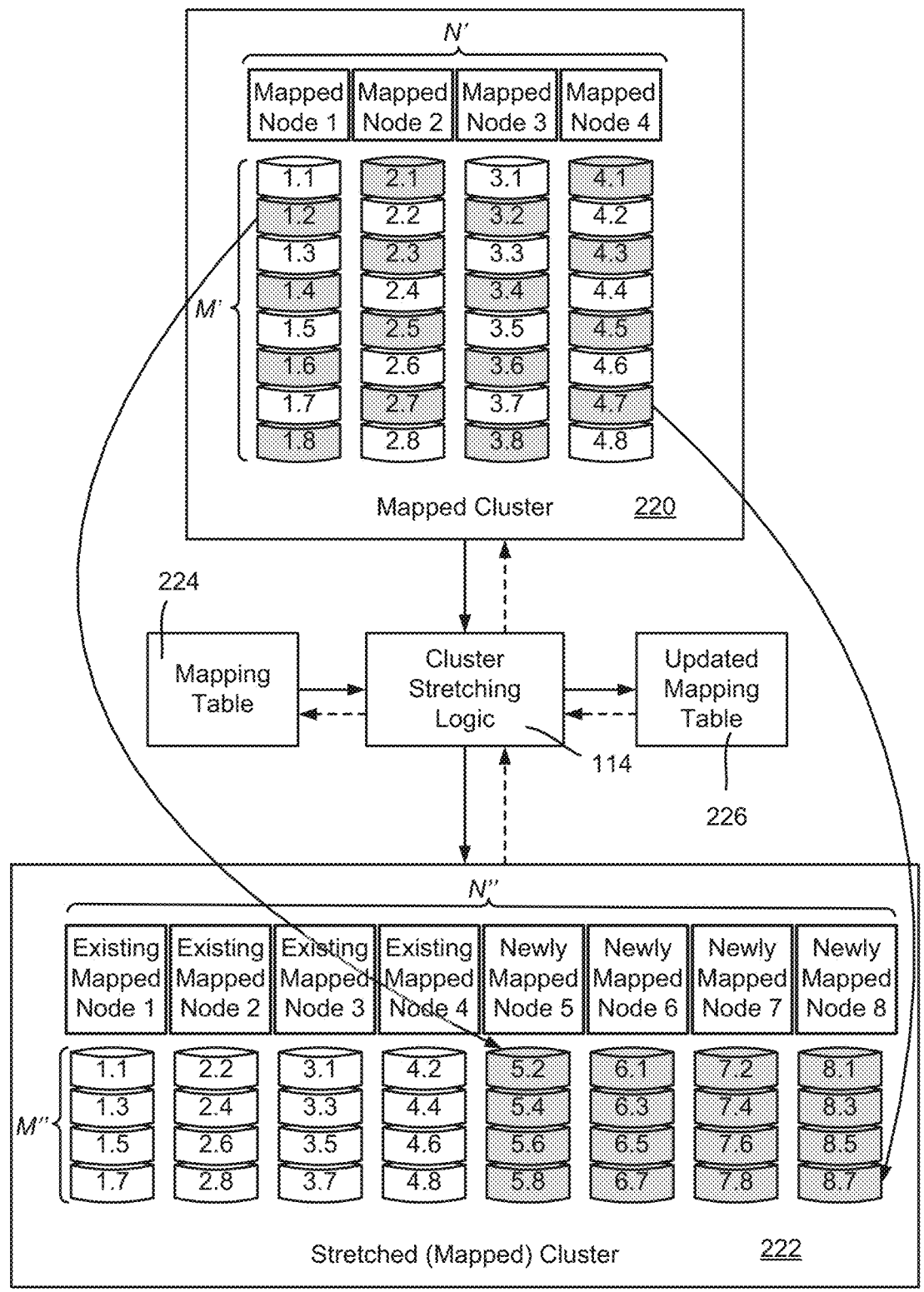
FIG. 2 is an example block diagram representation of stretching a mapped cluster, in accordance with various aspects and implementations of the subject disclosure.

To this end, as shown in FIGS. 1 and 2, based on various parameters 112 as described herein, cluster stretching logic 114 modifies (or regenerates) the mappings for the mapping table 108 in a way that stretches the mapped cluster. As will be understood, the cluster stretching logic 114 operates such that one or more new nodes are added to a mapped cluster to form a stretched mapped cluster, with the mapped disks distributed among the nodes of the stretched mapped cluster. For example, an existing mapped node can donate (have reassigned) some of its managed disks to a new mapped node, and so on. Thus, the same general amount of storage and data exists, but more computing resources, as a result of the newly added node(s), are available to process the stored data.

By way of example, consider the mapped cluster 220 of FIG. 2 (comprising N'=4 nodes), in which the cluster stretching logic 114 is instructed to stretch into the stretched (mapped) cluster 222 (comprising N"=8 nodes). In this example, the number of disks remains at 32 total, and thus the cluster "stretches" because its node count increases (doubles from four to eight in this example) while the set of disks the cluster manages remains the same.

As can be seen in the example of FIG. 2, the existing nodes (1-4) of the mapped cluster 220 each "donate" four of their managed disks (those shaded) to the newly mapped nodes (5-8). For example, the curved arrows show that storage device 1.2 is remapped to node 5 and that the storage device 4.7 is mapped to node 8. Note that the "node no.disk no." labeling shown herein only changes the node number in FIG. 2 for ease of explanation; however such numbering is only for explanation, and for example 8.4 instead of 8.7 is another possible way to identify the donated storage device in FIG. 2.

As is understood, the cluster stretching logic 114 updates the mapping table from an existing mapping table state 224, which relates mapped nodes with their disks, into an updated mapping table state 226. Note that no data re-protection is needed, because no data becomes more vulnerable after its wider distribution within one system.

As is understood, given a real cluster (its parameters with respect to the number of nodes and storage devices are generally irrelevant), the real cluster can accommodate a mapped cluster of N' mapped nodes, with each node managing M' disks. Consider that the workload the mapped cluster produces increases such that it is desirable for the node count to be increased to N" mapped nodes (N">N').

To this end, the cluster stretching logic operates to increase the number of mapped nodes by L (where L=N"−N'), where L is typically a whole number, and distribute the N'×M' storage devices of the mapped cluster between the N" mapped nodes the cluster has after stretching.

As can be readily appreciated, there are numerous different ways to accomplish the node increase and the storage device distribution. For example, the number of mapped nodes in the mapped cluster may be increased by adding L new mapped nodes to the end of the mapped cluster; the newly added mapped nodes can have the sequence numbers from N'+1 to N". After the cluster has been stretched, each mapped node manages M" disks, where $$M'' = \frac{M' * N'}{N''}$$

and M"<M'. The prior set of N' nodes (from 1 to N') continue to manage as many disks as remain after cluster stretching and donating the newly added nodes. The storage devices that the existing prior set of mapped nodes donate to the new L mapped nodes may be distributed evenly between the new mapped nodes, as in the example of FIG. 2, however this is only one implementation. Further, it may be beneficial to map the number of disks that an existing mapped node donates to the stretched cluster to a single new mapped node to the extent possible.

It should be noted that it is straightforward to "un-stretch" a stretched cluster. For example, as shown via the dashed arrows in FIG. 2, the cluster stretching logic can retain a copy of the mapping table 224 and switch back to using that copy instead of the updated mapping table 226, thereby returning to use the four-node mapped cluster 220. This, for example can be performed upon the stretched cluster 222 no longer being needed, e.g., after the analytics job has completed. The nodes that were added can be returned to another mapped cluster, for example, to be used for some other task. Although not explicitly shown in FIG. 2, it is understood that a mapped cluster can be un-stretched to have a lesser number of nodes than before. Indeed, if mapped nodes are needed for a stretched cluster, those mapped nodes can be taken from another mapped cluster by un-stretching that other mapped cluster to have fewer nodes.

Figure 3:
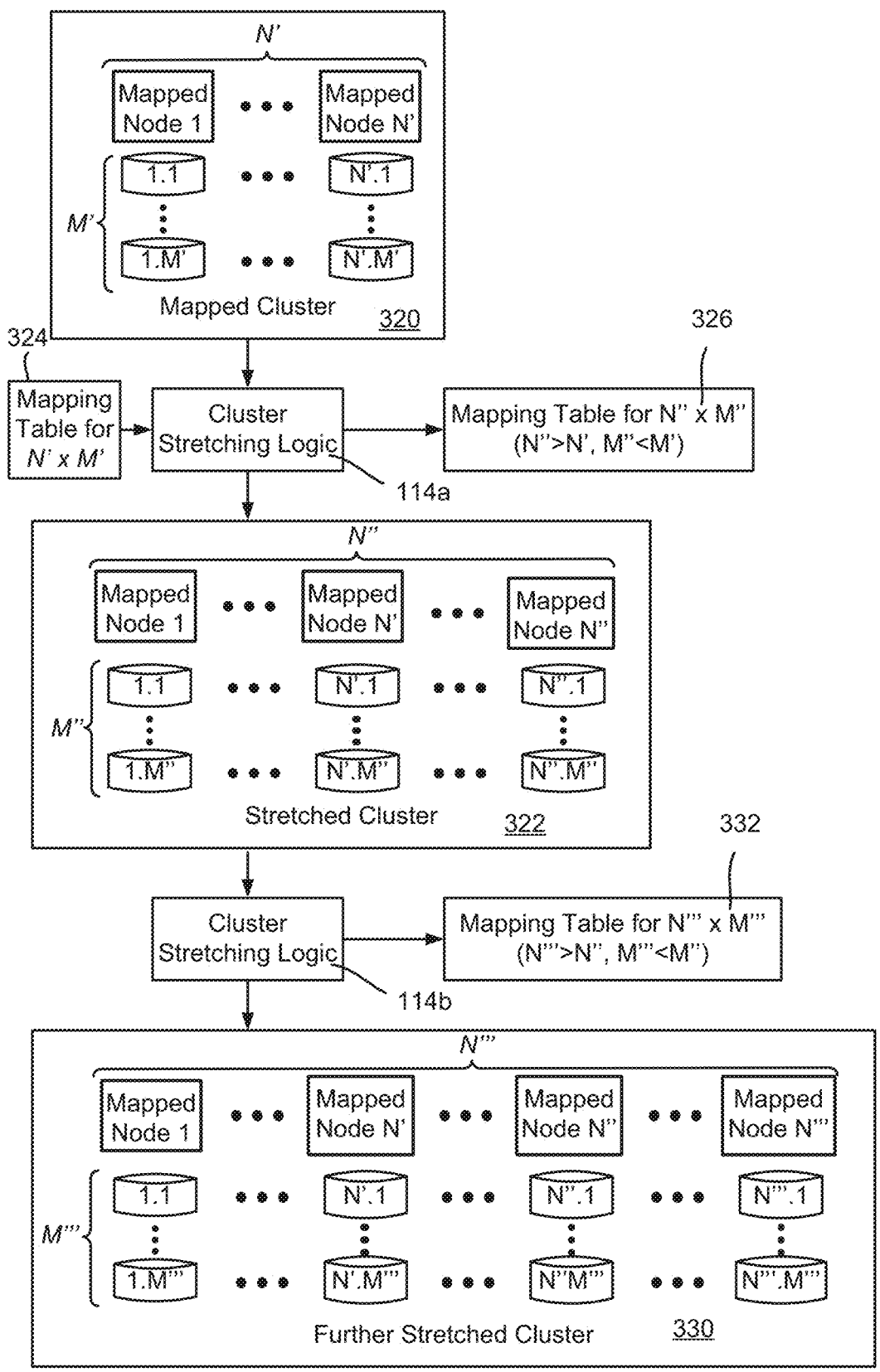
FIG. 3 is an example block diagram representation of stretching a mapped cluster, and further stretching the mapped cluster, in accordance with various aspects and implementations of the subject disclosure.

Although the example of FIGS. 2 and 3 use numbers that are straightforward to understand (e.g., the nodes double and the storage devices per node are halved), it is understood that the technology described herein is not limited to such even distributions. For example, a four node by eight (32 total) storage device mapped cluster can be stretched into a seven node stretched cluster, and thus some nodes (e.g., four) of the stretched mapped cluster each manage five storage devices, while others (e.g., three) each manage four. As can be seen, the storage devices still can be considered to be evenly distributed, that is, to the extent possible.

Moreover, it is not a requirement that nodes be evenly distributed. As one example, consider that a new node is considerably more powerful in terms of computing resources than an existing node. In such a situation, the newly added node can be given more storage devices to manage than an existing node, independent of whether the nodes are evenly distributed to the extent possible. Thus, distribution of the storage devices can be based on relative computing capabilities of the nodes of the stretched cluster.

FIG. 3 shows another concept, namely the further stretching of an already stretched cluster. By way of example, consider that a stretched cluster is operating well, but the results are desired sooner. The cluster can be further stretched. As another example, consider that a stretched cluster can, for example, be further stretched on nights and weekends when nodes that are otherwise very busy during a conventional work week can be reassigned when not needed; un-stretching can occur when the work week resumes.

In FIG. 3, there is a mapped cluster 320 of N' nodes each managing M' storage devices, which are stretched by cluster stretching logic (114a) a first time into the stretched cluster 322 of N" nodes each managing M" storage devices. As is understood, the state of the mapping table 324 is updated into the updating mapping table 326 as part of the stretching operations.

At some later time, as represented by the cluster stretching logic (e.g., running instance) 114b, the cluster stretching logic 114b stretches the stretched cluster 322 (N" nodes each managing M" storage devices) into a further stretched cluster 330 of N'" nodes each managing M'" storage devices, where N'">N" and M'"<M". The mapping table state is further updated, as represented by the mapping table 332.

Figure 4:
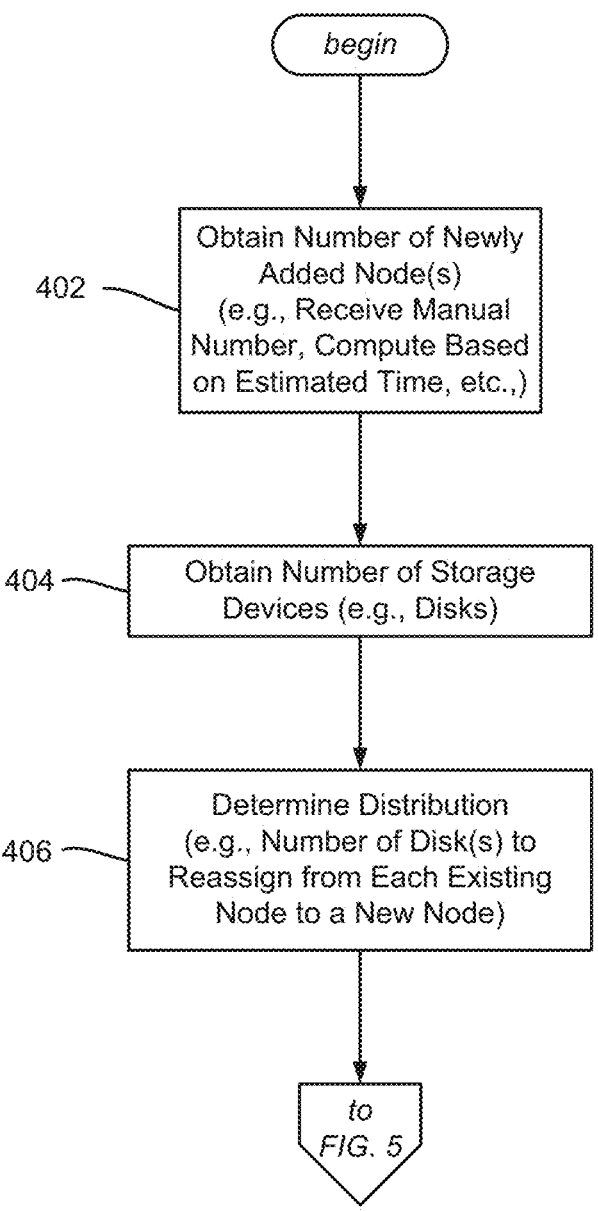
FIGS. 4 and 5 comprise a flow diagram showing example operations for stretching a mapped cluster, in accordance with various aspects and implementations of the subject disclosure.
Figure 5:
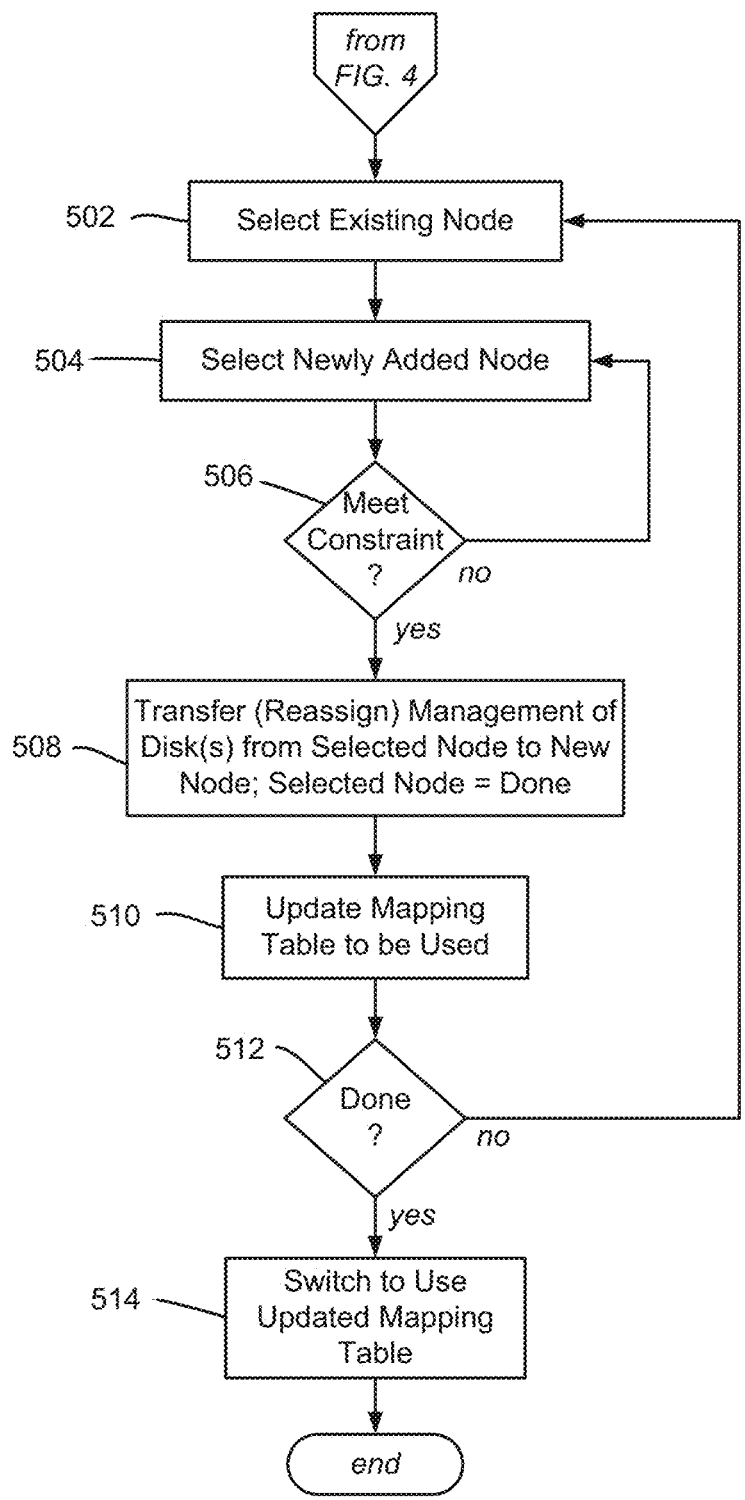

FIGS. 4 and 5 show example operations related to cluster stretching. In FIG. 4, operation 402 obtains the number of newly added nodes (which can be the number to increase L or a desired total number N", for example. It should be noted that cluster stretching can be manually initiated, at least to an extent; e.g., an administrator or the like can determine how many new mapped nodes to add to a mapped cluster to form the stretched cluster. However, it is also feasible for logic such as the cluster stretching logic to be configured to sense a need for additional mapped nodes, (e.g., by projecting how long data will take to process, or by processing a sample amount of the data), and can automatically (or suggest to) increase the number of mapped nodes, possibly after prompting the administrator to make the change.

Operation 402 represents obtaining the number of storage devices. Operation 406 represents determining the distribution, which, for example, can be an exactly even distribution, an even distribution to the extent possible, or based on some other criteria (such as relative processing power). The process continues at operation 502 of FIG. 5.

Operation 502 represents selecting an existing node, and operation 504 represents selecting a newly added node. Note that as set forth above, there can be a constraint that two or more disks managed by one real node cannot go to different mapped nodes of one mapped cluster; if the constraint is not evaluated as part of the distribution determination at operation 406, then operation 506 can evaluate whether the constraint is met or violated. If violated, a different new node can be selected for transferring the disks from the existing "old" selected node to the newly selected node; it is alternatively feasible to change the existing "old" selected node.

Operation 508 represents the transferring/reassigning of the one or more storage devices from the selected existing node to the newly added node. Operation 510 updates the mapping table, e.g., a temporary mapping table to which the system will switch when the stretching is complete.

Note that in the example of FIG. 5, an even distribution is exemplified; at operation 508 the selected existing node donates all of its storage devices to be reassigned to the newly added node (as in the example of FIG. 2), and then is done donating. However, if less than all are donated, it is straightforward to keep a count of donated storage devices per existing node, and then mark a node as done donating when that node has no more storage devices to donate. It is also feasible to donate all storage devices to be donated, not necessarily to a single new node as in FIG. 5, but rather to two or more new nodes. Other ways to achieve an even distribution until no storage devices remain to donate are feasible, and as described herein, and even distribution is only one possible implementation.

Operation 512 repeats the transferring of disk management until the distribution is complete and the cluster is stretched. At that time (or possibly a later time triggered by some criterion such as the end of the work day), operation 514 switches to use the updated mapping table and thereby operate the stretched cluster.

Figure 6:
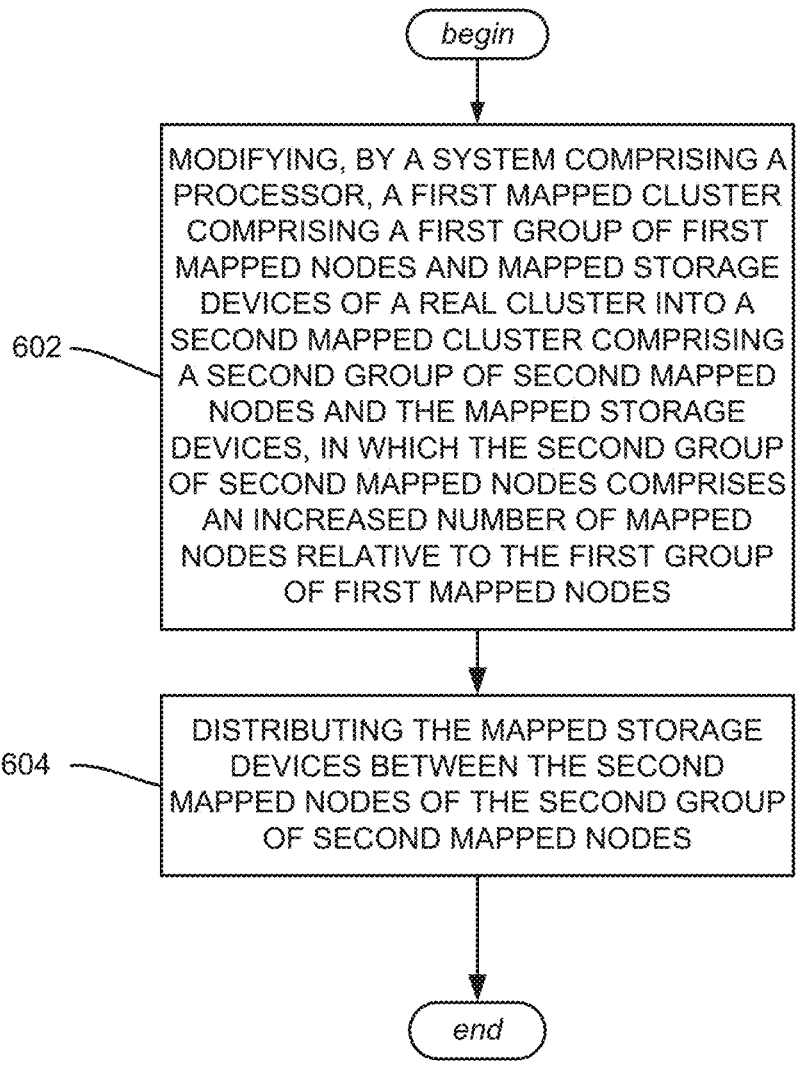
FIG. 6 is a flow diagram showing example operations for modifying one mapped cluster into another mapped cluster with an increased number of nodes, in accordance with various aspects and implementations of the subject disclosure.

One or more aspects of the technology described herein are represented as example operations in FIG. 6, which including operation 602 comprises modifying, by a system comprising a processor, a first mapped cluster comprising a first group of first mapped nodes and mapped storage devices of a real cluster into a second mapped cluster comprising a second group of second mapped nodes and the mapped storage devices, in which the second group of second mapped nodes comprises an increased number of mapped nodes relative to the first group of first mapped nodes. Operation 604 represents distributing the mapped storage devices between the second mapped nodes of the second group of second mapped nodes.

Distributing the mapped storage devices can comprise updating a mapping data structure that relates the first mapped cluster to the real cluster into an updated mapping data structure that relates the second mapped cluster to the real cluster.

Aspects can comprise reading data from a real node of the real cluster based on the updated mapping data structure.

The second group of second mapped nodes can have an increased number of the mapped nodes relative to the first group of first mapped nodes by way of adding a new mapped node; distributing the mapped storage devices can comprise reassigning a mapped storage device from a mapped node of the first group of first mapped nodes to the new mapped node in the second group of second mapped nodes. Distributing the mapped storage devices can comprise distributing the mapped storage devices evenly among the second group of second mapped nodes of the second mapped cluster.

The second group of second mapped nodes has an increased number of the mapped nodes relative to the first group of first mapped nodes by way of adding a new mapped node; distributing the mapped storage devices can comprise reassigning two or more mapped storage devices from a mapped node of the first group of first mapped nodes to the new mapped node in the second group of second mapped nodes.

Distributing the mapped storage devices can comprise distributing the mapped storage devices based on relative computing capabilities of the second mapped nodes of the second mapped cluster.

Aspects can comprise remodifying the second mapped cluster into a third group of third mapped nodes and the mapped storage devices, in which the third group of third mapped nodes has a decreased number of mapped nodes relative to the second group of second mapped nodes, and distributing the mapped storage devices between third mapped nodes of the third group of mapped nodes.

Aspects can comprise remodifying the second mapped cluster into the first group of first mapped nodes and the mapped storage devices, and distributing the mapped storage devices between the first mapped nodes of the first group of first mapped nodes.

Figure 7:
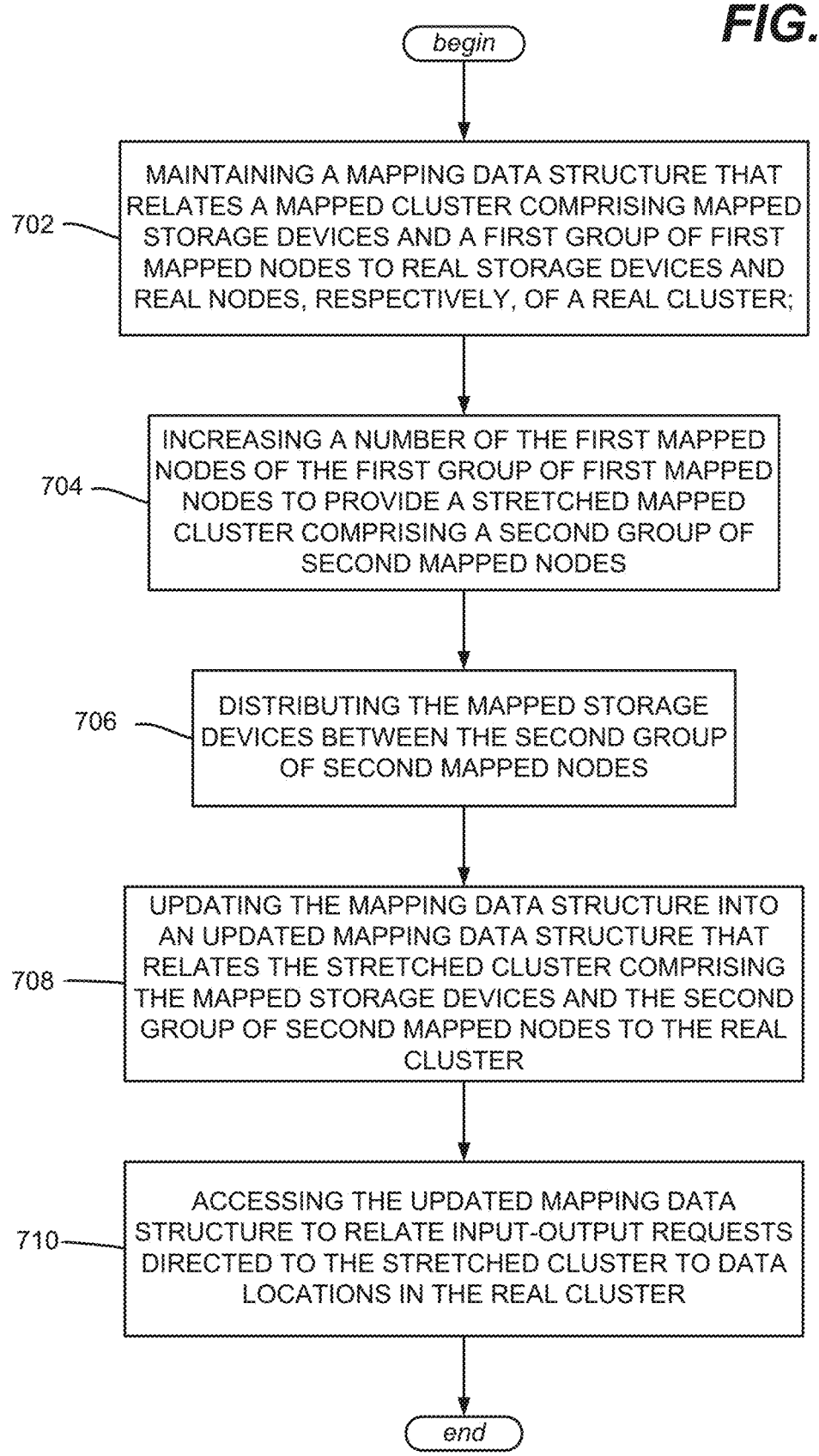
FIG. 7 is a flow diagram showing example operations for updating and using a mapping table for using a mapped cluster with an increased number of nodes, in accordance with various aspects and implementations of the subject disclosure.

One or more aspects are represented in FIG. 7, such as embodied in a system, comprising a processor and a memory that stores executable instructions that, when executed by the processor, facilitate performance of operations. Example operations can comprise operation 702, which represents maintaining a mapping data structure that relates a mapped cluster comprising mapped storage devices and a first group of first mapped nodes to real storage devices and real nodes, respectively, of a real cluster. Operation 704 represents increasing a number of the first mapped nodes of the first group of first mapped nodes to provide a stretched mapped cluster comprising a second group of second mapped nodes. Operation 706 represents distributing the mapped storage devices between the second group of second mapped nodes. Operation 708 represents updating the mapping data structure into an updated mapping data structure that relates the stretched cluster comprising the mapped storage devices and the second group of second mapped nodes to the real cluster. Operation 710 represents accessing the updated mapping data structure to relate input-output requests directed to the stretched cluster to data locations in the real cluster.

Distributing the mapped storage devices can comprise distributing the mapped storage devices evenly among the second group of second mapped nodes of the stretched cluster.

Further operations can comprise decreasing a number of the second mapped nodes of the second group to provide the mapped cluster comprising the first group of first mapped nodes, distributing the mapped storage devices between the first group of first mapped nodes, re-updating the mapping data structure into the mapping data structure that relates the mapped storage devices and the first group of first mapped nodes to the real cluster, and accessing the mapping data structure to relate input-output requests directed to the mapped cluster to data locations in the real cluster.

Increasing the number of the first mapped nodes operations adding a new mapped node; distributing the mapped storage devices operations reassigning two or more mapped storage devices from a mapped node of the first group of first mapped nodes to the new mapped node in the second group of second mapped nodes.

Distributing the mapped storage devices can comprise distributing the mapped storage devices based on relative computing capabilities of the second mapped nodes of the second group.

Figure 8:
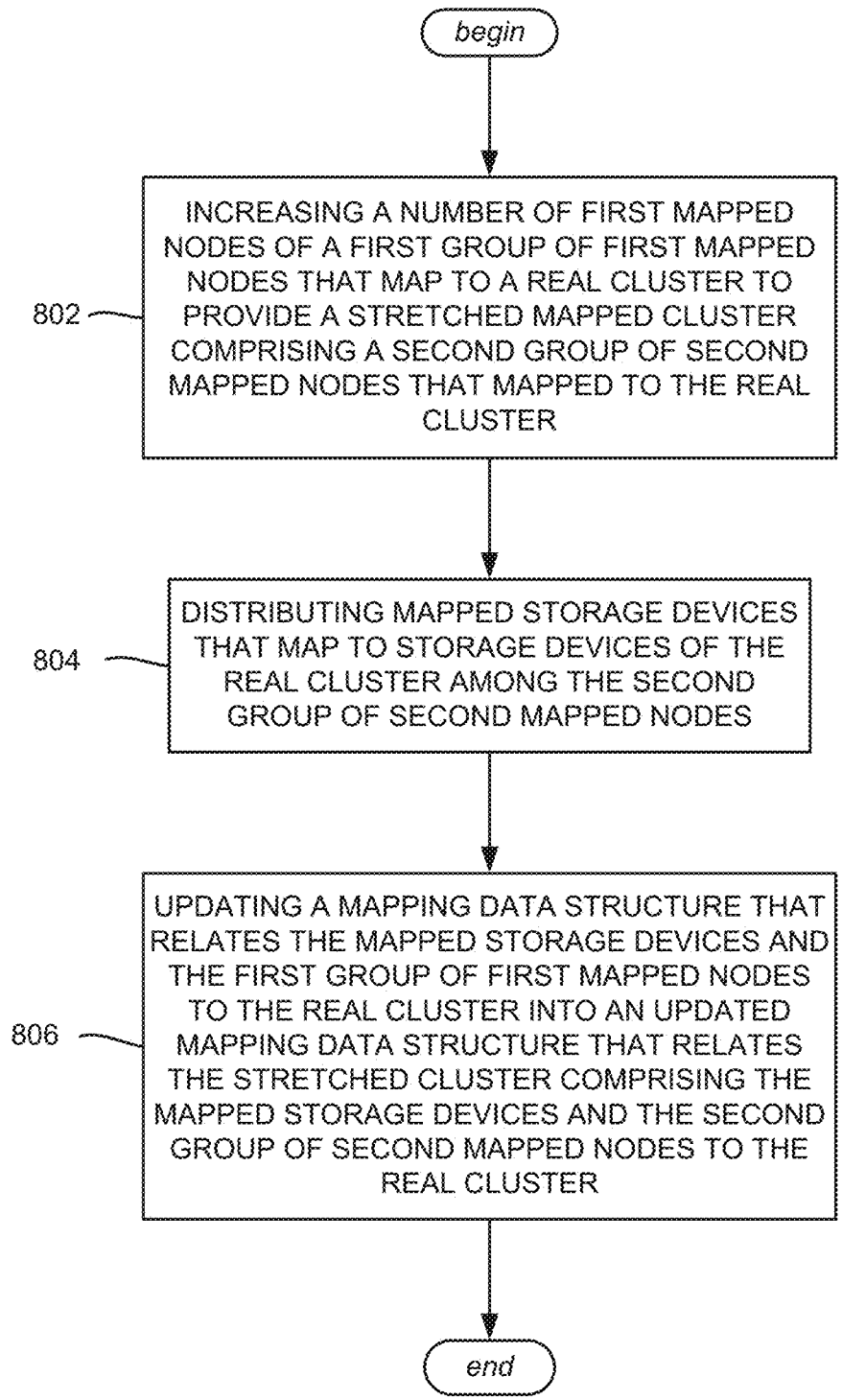
FIG. 8 is a flow diagram showing example operations for updating a mapped cluster into a stretched cluster, in accordance with various aspects and implementations of the subject disclosure.

One or more aspects are represented as example operations in FIG. 8, and for example, can correspond a machine-readable storage medium, comprising executable instructions that, when executed by a processor, facilitate performance of the operations. Operation 802 represents increasing a number of first mapped nodes of a first group of first mapped nodes that map to a real cluster to provide a stretched mapped cluster comprising a second group of second mapped nodes that mapped to the real cluster. Operation 804 represents distributing mapped storage devices that map to storage devices of the real cluster among the second group of second mapped nodes. Operation 806 represents updating a mapping data structure that relates the mapped storage devices and the first group of first mapped nodes to the real cluster into an updated mapping data structure that relates the stretched cluster comprising the mapped storage devices and the second group of second mapped nodes to the real cluster.

Further operations can comprise accessing the updated mapping data structure to relate input-output requests directed to the stretched cluster to data locations in the real cluster.

Distributing the mapped storage devices can comprise distributing the mapped storage devices evenly or substantially evenly among the second group of the second mapped nodes of the second mapped cluster.

The second group of second mapped nodes can have an increased number of mapped nodes relative to the first group of first mapped nodes by way of adding a new mapped node; distributing the mapped storage devices can comprise reassigning two or more mapped storage devices from a mapped node of the first group of first mapped nodes to the new mapped node in the second group of second mapped nodes.

Further operations can comprise modifying the stretched cluster into a third group of third mapped nodes and the mapped storage devices, in which the third group of third mapped nodes has an increased number of mapped nodes relative to the second group of second mapped nodes, and distributing the mapped storage devices between the third mapped nodes of the third group of mapped nodes.

Further operations can comprise modifying the stretched cluster into a third group of third mapped nodes and the mapped storage devices, in which the third group of third mapped nodes has a decreased number of mapped nodes relative to the second group of second mapped nodes, and distributing the mapped storage devices between the third mapped nodes of the third group of third mapped nodes.

As can be seen, the virtualization technology available via mapped RAIN is able to build more flexible cluster-based computing/data storage systems, including the stretching of a cluster-based storage system to add computing power. Cluster stretching is appropriate for handling an increase of workload in a cluster-based storage system. Further, a stretched cluster can be further stretched, un-stretched and/or otherwise modified as desired.

Figure 9:
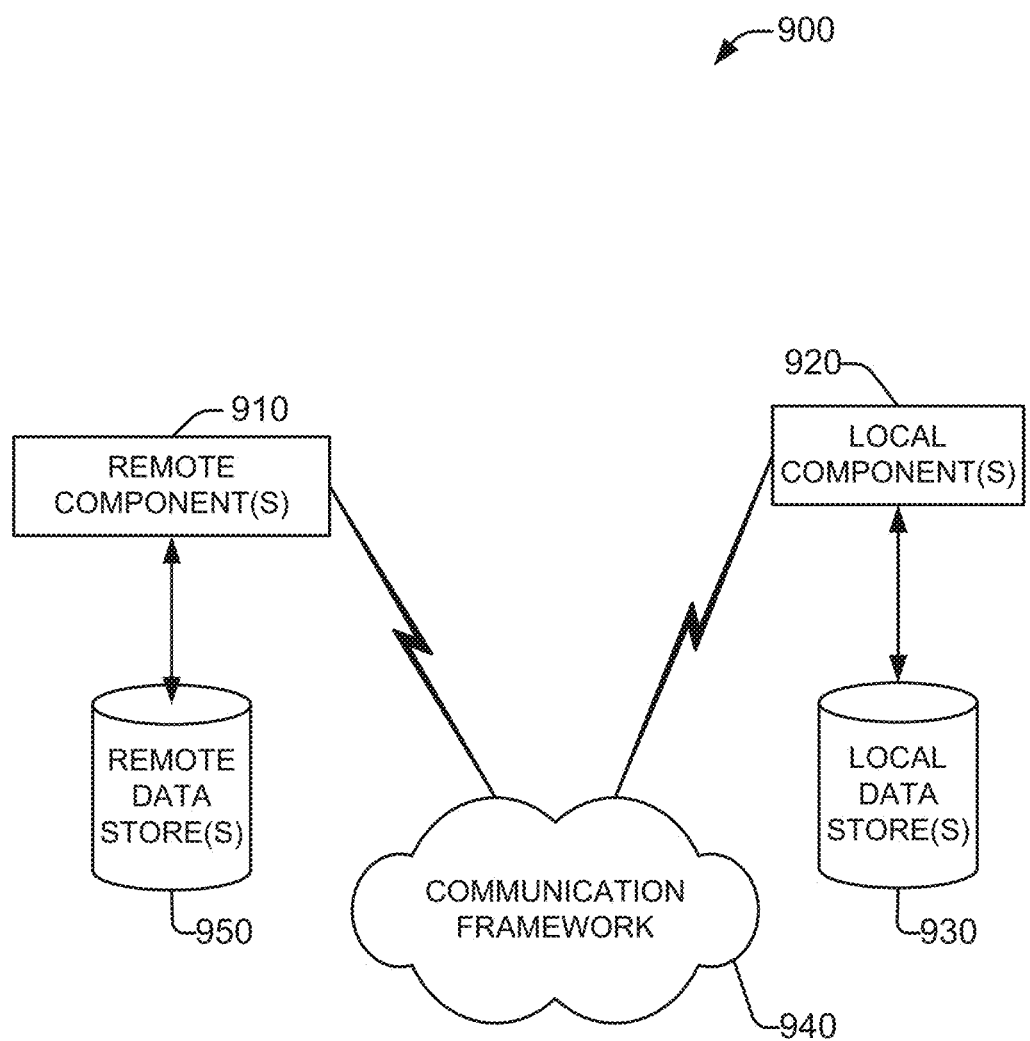
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
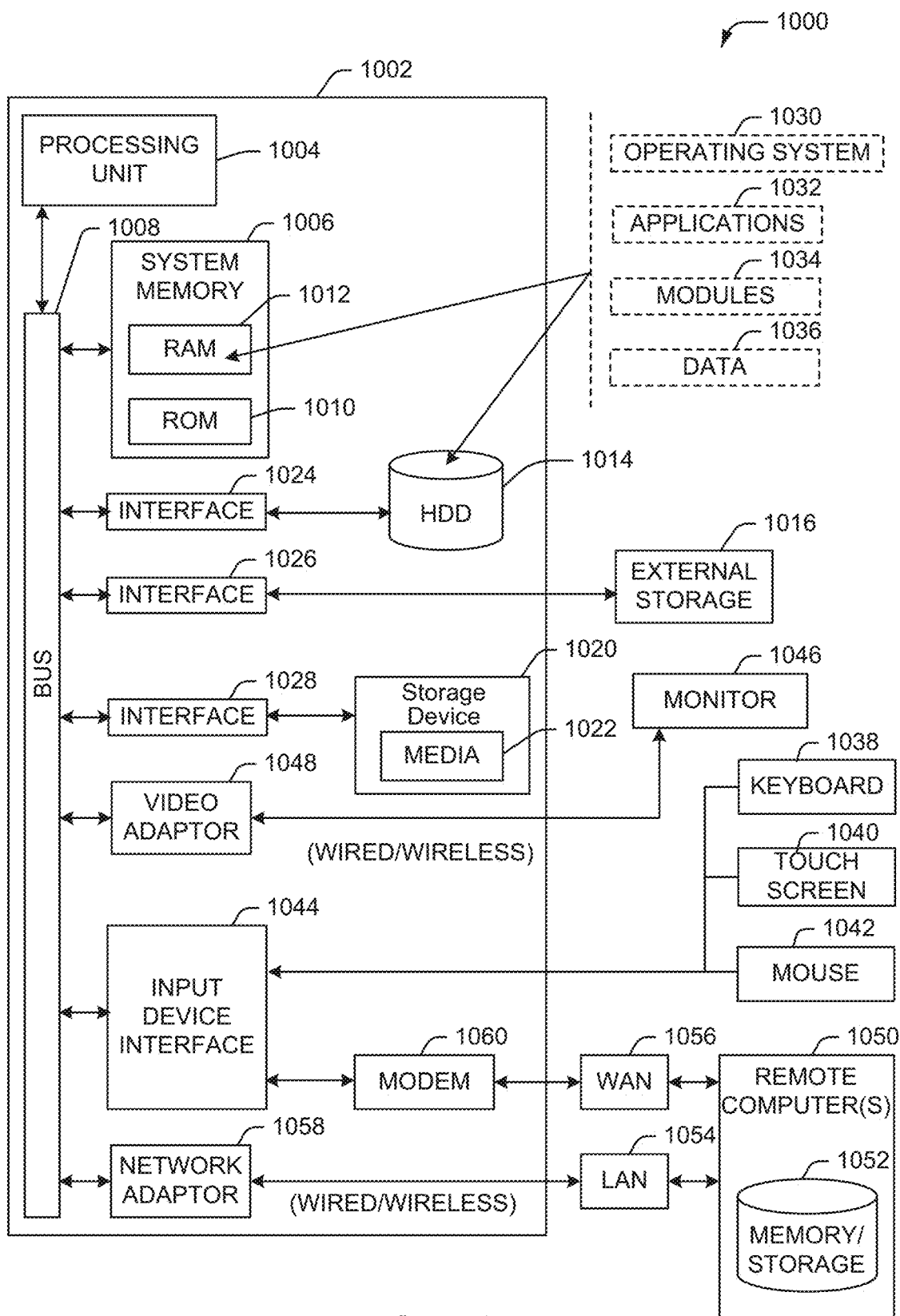
FIG. 10 illustrates an example block diagram of a computing system operable to execute the disclosed systems and methods in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising,
modifying, by a system comprising a processor, a first mapped cluster comprising a first group of first mapped nodes and mapped storage devices of a real cluster into a second mapped cluster comprising a second group of second mapped nodes and the mapped storage devices, in which the second group of second mapped nodes comprises an increased number of mapped nodes relative to the first group of first mapped nodes;
distributing the mapped storage devices between the second mapped nodes of the second group of second mapped nodes;
based on a cluster stretching logic, processing a sample data set to sense a first request for additional mapped nodes; and
based on the first request for the additional mapped nodes being sensed, generating a second request to increase the first group of first mapped nodes from a first number of mapped nodes to a second number of mapped nodes.

2. The method of claim 1, wherein the distributing the mapped storage devices comprises updating a mapping data structure that relates the first mapped cluster to the real cluster into an updated mapping data structure that relates the second mapped cluster to the real cluster.

3. The method of claim 2, further comprising reading data from a real node of the real cluster based on the updated mapping data structure.

4. The method of claim 1, wherein the second group of second mapped nodes has an increased number of the mapped nodes relative to the first group of first mapped nodes by way of adding a new mapped node, and wherein the distributing the mapped storage devices comprises reassigning a mapped storage device from a mapped node of the first group of first mapped nodes to the new mapped node in the second group of second mapped nodes.

5. The method of claim 1, wherein the distributing the mapped storage devices comprises distributing the mapped storage devices evenly among the second group of second mapped nodes of the second mapped cluster.

6. The method of claim 1, wherein the second group of second mapped nodes has an increased number of the mapped nodes relative to the first group of first mapped nodes by way of adding a new mapped node, and wherein the distributing the mapped storage devices comprises reassigning two or more mapped storage devices from a mapped node of the first group of first mapped nodes to the new mapped node in the second group of second mapped nodes.

7. The method of claim 1, wherein the distributing the mapped storage devices comprises distributing the mapped storage devices based on relative computing capabilities of the second mapped nodes of the second mapped cluster.

8. The method of claim 1, further comprising:
remodifying the second mapped cluster into a third group of third mapped nodes and the mapped storage devices, in which the third group of third mapped nodes has a decreased number of mapped nodes relative to the second group of second mapped nodes, and
distributing the mapped storage devices between third mapped nodes of the third group of mapped nodes.

9. The method of claim 1, further comprising:
remodifying the second mapped cluster into the first group of first mapped nodes and the mapped storage devices, and
distributing the mapped storage devices between the first mapped nodes of the first group of first mapped nodes.

10. A system, comprising:
a processor; and
a memory that stores executable instructions that, when executed by the processor, facilitate performance of operations, the operations comprising:
maintaining a mapping data structure that relates a mapped cluster comprising mapped storage devices and a first group of first mapped nodes to real storage devices and real nodes, respectively, of a real cluster;

based on a cluster stretching logic, processing a sample data set to sense a first request for additional mapped nodes for the real cluster;
increasing a first number of the first mapped nodes of the first group of first mapped nodes to provide a stretched mapped cluster comprising a second number of second mapped nodes of a second group of second mapped nodes;
distributing the mapped storage devices between the second group of second mapped nodes;
based on detecting a second request to decrease the stretched mapped cluster to a third number of third mapped nodes of a third group of third mapped nodes less than the second number, prompting an administrator device associated with an administrator identity to decrease the stretched mapped cluster to the third number, resulting in a modified mapped cluster comprising the third group of third mapped nodes;
updating the mapping data structure into an updated mapping data structure that relates the modified mapped cluster, comprising the mapped storage devices and the third group of third mapped nodes, to the real cluster; and
accessing the updated mapping data structure to relate first input-output requests directed to the modified mapped cluster to data locations in the real cluster.

11. The system of claim 10, wherein the distributing the mapped storage devices comprises distributing the mapped storage devices evenly among the second group of second mapped nodes of the stretched mapped cluster.

12. The system of claim 10, wherein the operations further comprise a modifying the third number of the third mapped nodes of the third group to revert to the mapped cluster comprising the first group of first mapped nodes, distributing the mapped storage devices between the first group of first mapped nodes, updating the updated mapping data structure to return to the mapping data structure that relates the mapped storage devices and the first group of first mapped nodes to the real cluster, and accessing the mapping data structure to relate second input-output requests directed to the mapped cluster to the data locations in the real cluster.

13. The system of claim 10, wherein the increasing the number of the first mapped nodes comprises adding a new mapped node, and wherein the distributing the mapped storage devices comprises reassigning two or more mapped storage devices from a mapped node of the first group of first mapped nodes to the new mapped node in the second group of second mapped nodes.

14. The system of claim 10, wherein the distributing the mapped storage devices comprises distributing the mapped storage devices based on relative computing capabilities of the second mapped nodes of the second group.

15. A non-transitory machine-readable medium, comprising executable instructions that, when executed by a processor, facilitate performance of operations, the operations comprising:
based on a cluster stretching logic, processing a sample data set to sense a first request for additional mapped nodes that map to a real cluster;
increasing a first number of first mapped nodes of a first group of first mapped nodes that map to the real cluster to provide a stretched mapped cluster comprising a second group of second mapped nodes that mapped to the real cluster, the second group of second mapped nodes having a second number of second mapped nodes that is greater than the first number;
distributing mapped storage devices that map to storage devices of the real cluster among the second group of second mapped nodes;
sending a second request to an administrator device associated with an administrator identity to decrease the second group of second mapped nodes from the second number of second mapped nodes to a third number of second mapped nodes, wherein the second group being decreased results in a modified mapped cluster comprising a modified second group of second mapped nodes with the third number of second mapped nodes; and
updating a mapping data structure that relates the mapped storage devices and the first group of first mapped nodes to the real cluster into an updated mapping data structure that relates the modified mapped cluster, comprising the mapped storage devices and the modified second group of second mapped nodes, to the real cluster.

16. The non-transitory machine-readable medium of claim 15, wherein the operations further comprise accessing the updated mapping data structure to relate input-output requests directed to the modified mapped cluster to data locations in the real cluster.

17. The non-transitory machine-readable medium of claim 15, wherein the distributing the mapped storage devices comprises distributing the mapped storage devices evenly or substantially evenly among the second group of the second mapped nodes of the second mapped cluster.

18. The non-transitory machine-readable medium of claim 15, wherein the second group of second mapped nodes has an increased number of mapped nodes relative to the first group of first mapped nodes by way of adding a new mapped node, and wherein the distributing the mapped storage devices comprises reassigning two or more mapped storage devices from a mapped node of the first group of first mapped nodes to the new mapped node in the second group of second mapped nodes.

19. The non-transitory machine-readable medium of claim 15, wherein the operations further comprise modifying the modified mapped cluster into a third group of third mapped nodes and the mapped storage devices, in which the third group of third mapped nodes has an increased number of mapped nodes relative to the third number of the modified second group of second mapped nodes, and distributing the mapped storage devices between the third mapped nodes of the third group of mapped nodes.

20. The non-transitory machine-readable medium of claim 15, wherein the operations further comprise modifying the modified mapped cluster into a third group of third mapped nodes and the mapped storage devices, in which the third group of third mapped nodes has a decreased number of mapped nodes relative to the third number of the modified second group of second mapped nodes, and distributing the mapped storage devices between the third mapped nodes of the third group of third mapped nodes.

* * * * *